United States Patent [19]

Duthion et al.

[11] E Re. 29,161

[45] Reissued Mar. 29, 1977

[54] DEVICES FOR THE GENERATION OF ULTRASONICS AND THEIR APPLICATION TO THE PREPARATION OF EMULSIONS

[75] Inventors: Louis Duthion, Paris; Claude Charles Doyotte, Le Plessis Robinson; Claude Jean-Marie Seguela, Argenteuil; Gabriél Barthelemy, Paris; Alain Cinquanta; Yves Drapeau, both of Le Havre, all of France

[73] Assignee: Compagnie Francaise de Raffinage, Paris, France

[22] Filed: Oct. 29, 1975

[21] Appl. No.: 626,835

Related U.S. Patent Documents

Reissue of:

[64] Patent No.: 3,809,372
Issued: May 7, 1974
Appl. No.: 286,061
Filed: Sept. 5, 1972

[30] Foreign Application Priority Data

| | | |
|---|---|---|
| Sept. 3, 1971 | France | 71.31975 |
| Dec. 20, 1971 | France | 71.45738 |
| June 27, 1972 | France | 72.23201 |

[52] U.S. Cl. ..... 259/4 R; 259/DIG. 30; 259/DIG. 43; 259/DIG. 44

[51] Int. Cl.[2] ..... B01F 3/08; B01F 5/06

[58] Field of Search ..... 259/4 R, 18, 36, 60, 259/95, DIG. 30, DIG. 43, DIG. 44; 261/DIG. 48

[56] References Cited

UNITED STATES PATENTS

| | | | |
|---|---|---|---|
| 3,658,302 | 4/1972 | Duthion et al. | 259/4 R X |
| 3,744,762 | 7/1973 | Schlicht | 259/4 R |

*Primary Examiner*—Robert W. Jenkins
*Assistant Examiner*—Alan Cantor
*Attorney, Agent, or Firm*—Curtis, Morris & Safford

[57] ABSTRACT

A device for generating [ ultrasonic ] waves in a fluid preferably used in emulsifying water and fuel oil and the like constructed of two side plates (each having at least one recess, occurring in adjacent pairs) and a thin steel membrane disk having a liquid access groove (discontinuities) cut out of said disk and extending into said recess such that the remaining portion of the membrane disk extending across each recess pair vibrates (preferably resonates) in the liquid flowing through said groove and into one of said recesses to pass out a discharge conduit extending from the base of such recess.

28 Claims, 13 Drawing Figures

FIG.1
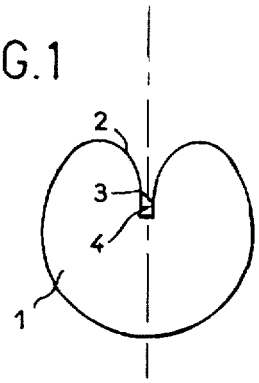
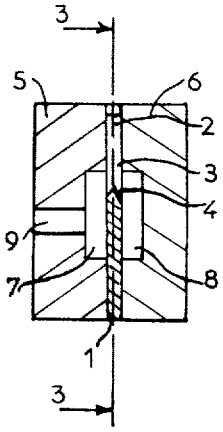
FIG.2
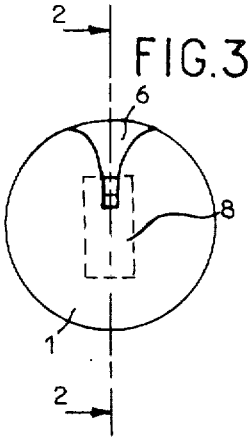
FIG.3
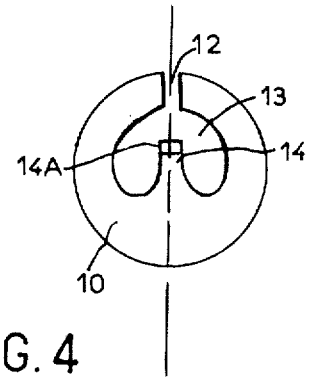
FIG. 4
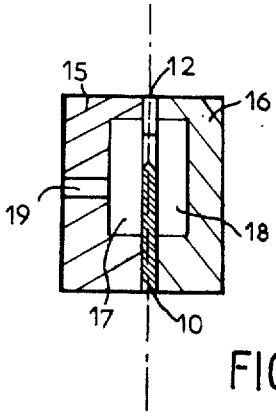
FIG.5
FIG.6
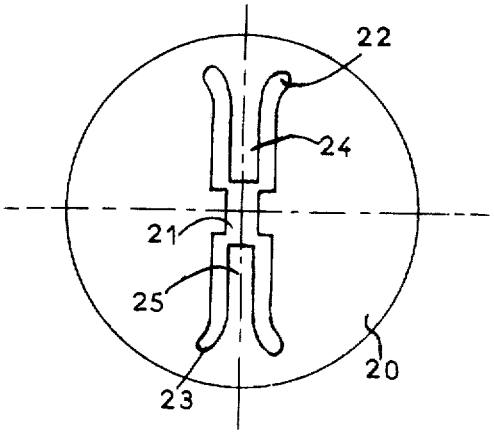
FIG. 7
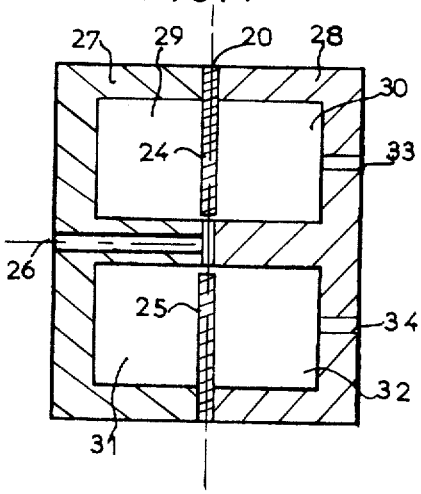

DEVICES FOR THE GENERATION OF ULTRASONICS AND THEIR APPLICATION TO THE PREPARATION OF EMULSIONS

Matter enclosed in heavy brackets [ ] appears in the original patent but forms no part of this reissue specification; matter printed in italics indicates the additions made by reissue.

The present invention relates to the generation of [ ultrasonics ] *waves in fluids.*

More particularly it concerns devices for generating *sonic and/or* ultrasonic waves in a liquid medium, and the applications of these devices to the manufacture of emulsions; particularly emulsions of water in fuel oil and emulsions of paraffin wax or microcrystalline wax in water.

It is known that a jet of fluid emitted through the slit of a nozzle and having a thin blade located in front thereof with one end fixed, causes said blade located in front thereof with one end fixed, causes said blade to vibrate. The vibration of the blade is accompanied by the propagation in the fluid of waves whose frequency depends on the geometry of the blade, its position, or more generally its situation, and the conditions of flow of the fluid.

Such a method can be carried out for a long period of time only by means of devices which incorporate a vibrating blade of very great endurance (i.e., capable of vibrating without difficulty over a very extended period of time). This requirement makes it necessary to use metals which are particularly resistant to the fatigue caused by numerous periodic deformations.

An object of the present invention is to perfect devices for generating *sonic and/or* ultrasonic waves in a fluid which does not require the use in the manufacture of the vibrating element of a material of particularly high performance.

According to the present invention, this result is obtained by a special arrangement of the vibrating element.

Embodying the present invention are devices for generating [ ultrasonics ] *sonic and/or ultrasonic waves* in a fluid, which devices each comprise a membrane placed between two side plates. Each plate has at least one recess. The membrane has a first discontinuity which forms a passage through which the fluid penetrates into the device between the two side plates. The first discontinuity is continued by one or more second discontinuities which form communication between the recesses (located in pairs on opposite sides of the membrane) with a conduit associated with each pair through which the fluid is evacuated from the device.

In a first type of device, each side plate has only a single recess. In this type of device are associated on the one hand, with devices whose first discontinuity is located on the periphery of the membrane and whose second discontinuity is the extension of the first discontinuity, and on the other hand, devices whose first discontinuity is located on the periphery of the membrane and whose second discontinuity has a shape such that it defines a blade in the membrane.

In a second type of device, each side plate is provided with a plurality of recesses. The recesses of the two side plates are located opposite each other forming pairs. In this type of device, the first discontinuity in the membrane is single and central. On the other hand, there are as many second discontinuities as there are pairs of recesses. The second discontinuities may be simple grooves forming a passage between the two recesses of a pair, or the second discontinuities may be more complicated and have a plurality of branches which define blades in the membrane.

In utilizing the foregoing devices for obtaining emulsions of water in fuel oil for feeding boilers, the parameters (number of recesses, volume of recesses, dimensions of the discontinuities of the membrane, etc.) are imparted values adapted to the power requirements of the installation. These parameters therefore have a specific value for each given installation. However, the invention also contemplates forming the structure of said devices in such a manner that the same side plates are suitable for a wide range of given installations — with only the membranes being specific to each given installation — by separately determining on the one hand the entire parameters specific to the side plates and on the other hand the entire parameters specific to the membrane. Thus the invention makes it possible to use standard elements which can be adapted to all installations whose thermal power is, for instance, between 30 and 700 therms/hour. The advantage resulting herefrom is obvious to the man skilled in the art and therefore need not be described.

Thus a further embodiment of the present invention comprises:

a. Two side plates provided with at least two recesses each, the recesses of each side plate being located opposite those of the opposite side plate;

b. A membrane placed between the two side plates, each membrane having at least one first discontinuity which forms a passage through which the fluid penetrates into the device and which is continued by a second discontinuity which forms a communication in each pair of recesses;

c. A conduit for the introduction of the fluid in communication with the outside;

d. Conduits through which the fluid is evacuated from each pair of recesses, the said conduits being in communication with the outside.

More generally in this embodiment, the invention has standard side plates with a maximum number of recesses, so that these side plates can be used for a very wide range of rates of flow of fluid.

The adaptation to a given rate of flow is obtained by the selection of an appropriate membrane which is placed between the standardized side plates which make it possible to vary three parameters, namely:

1. The number of pairs of recesses used;
2. The thickness of the membrane;
3. The width of the discontinuities.

The member of pairs of recesses used depends solely on the number of discontinuities which the membrane has. The more discontinuities the membrane has the higher the number of pairs of recesses which it places in communication, and the higher the rate of flow of fluid which the installation can accommodate (all other things being equal).

The thickness of the membrane, which may vary, for instance, between 10/100 and 20/100 of a mm by 1/100 of a mm if necessary, determines the thickness of the lamina of fluid entering the device through the first discontinuity or discontinuities of the membrane. The greater this thickness the higher the rate of flow of fluid which the installation permits (for the same number of discontinuities).

The rate of flow also may increase with the width of the discontinuities, all other things being equal.

In the case of the application of the device to the production of emulsions of water in fuel oil for the feeding of boilers, a very wide range of power, for instance from 30 to 700 therms/hour, may be encompassed by the use of the same pair of side plates having the number of pairs of recesses necessary for the feeding of a boiler of 700 therms/hour, with the particular power of the installation being satisfied by the use of a membrane which is placed between the two side plates and the thickness and number of discontinuities of which are adapted to the power contemplated.

The invention also concerns in particular the application of the said devices to the obtaining of emulsions of paraffin or microcrystalline wax in water. By "paraffin wax" is meant herein a particular paraffin wax or a mixture of paraffin waxes having a crystalline structure and the melting point of which is between 45° C and 66° C. A large part of the paraffin wax (generally at least 40 percent by weight) is formed of linear saturated aliphatic hydrocarbons. The oil content is less than 5 percent by weight, and preferably less than 1 percent. By "microcrystalline wax" is meant a mixture of saturated hydrocarbons of molecular weights higher than the paraffin wax. A microcrystalline wax has more cyclic or branched saturated molecules and is generally richer in oil than a paraffin wax. As its name states, it is microcrystalline, and its melting point is between 66° C and 90° C.

Emulsions of paraffin or microcrystalline wax have numerous applications. They are used in particular to fireproof boards formed of particles of wood or other materials and for the sizing of paper.

In the prior art these emulsions are generally obtained by dispersing liquid paraffin wax by agitation in water in the presence of a certain amount of emulsifier in the medium. The agitation is generally effected by means of an ordinary bladed agitator or by means of a turbine. When the emulsifier is of an ionic nature, it may be synthesized in situ. Thus, for instance, anionic emulsions of paraffin wax are obtained by reaction of an amine with a fatty acid, the amine and the fatty acid being added either together or separately to the water and/or to the paraffin wax.

In the use of the devices in accordance with the present invention to prepare emulsions of paraffin or microcrystalline wax is water, the water, the paraffin or microcrystalline wax, and the emulsifier agent are introduced through a common inlet orifice into the emulsifying device, and the emulsion is collected at an outlet orifice connected to at least one pair of recesses located in the side plates. The difference in pressure present between the inlet orifice and the outlet orifice is preferably greater than or equal to two bars.

In this specification and the accompanying drawings we have shown and described a preferred embodiment of our invention and have suggested various alternatives and modifications thereof; but it is to be understood that these are not intended to be exhaustive and that many other changes and modifications can be made within the scope of the invention. These suggestions herein are selected and included for purposes of illustration in order that others skilled in the art will more fully understand the invention and the principles thereof and will thus be enabled to modify it and embody it in a variety of forms, each as may be best suited to the conditions of a particular use.

In the accompanying figures, devices or parts thereof embodying the present invention for the obtaining of emulsions of water in fuel oil and of emulsions of paraffin or microcrystalline wax in water will be described.

FIG. 1 shows in a frontal view, a membrane for use in a device of the first type;

FIG. 2 shows, in cross section, along the line 2—2 of FIG. 3, a device in accordance with a preferred embodiment of the present invention provided with the membrane shown in FIG. 1;

FIG. 3 shows a section through the device along the line 3—3 of FIG. 2;

FIG. 4 shows, in front view, a modified membrane for use in a device of the first type;

FIG. 5 shows, in section, along the plane of symmetry of the membrane perpendicular thereto, a device provided with the membrane shown in FIG. 4;

FIG. 6 shows, in a frontal view, a membrane for use in a device of the second type;

FIG. 7 shows, in section, along the plane of symmetry of the membrane perpendicular thereto, a device provided with the membrane shown in FIG. 6;

Figure 8:
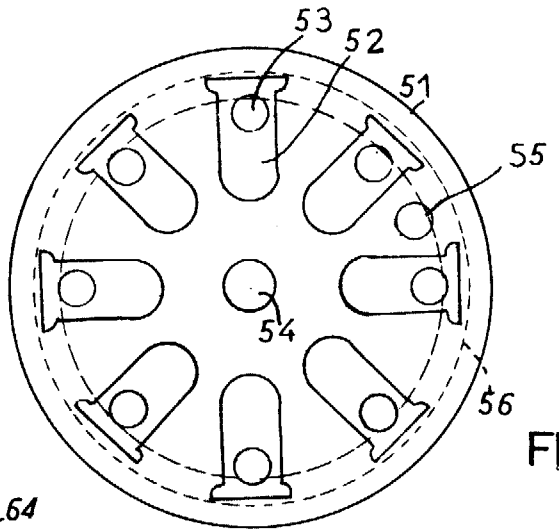
Figure 9:
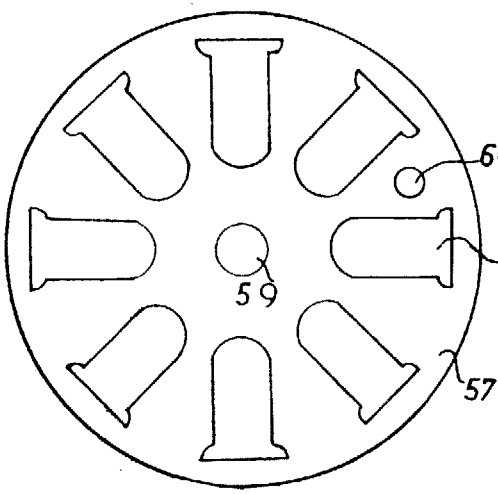
Figure 10:
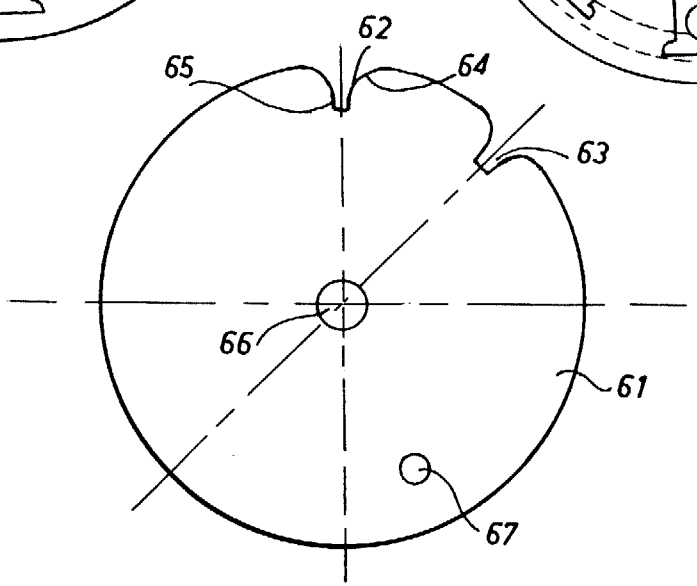
Figure 11:
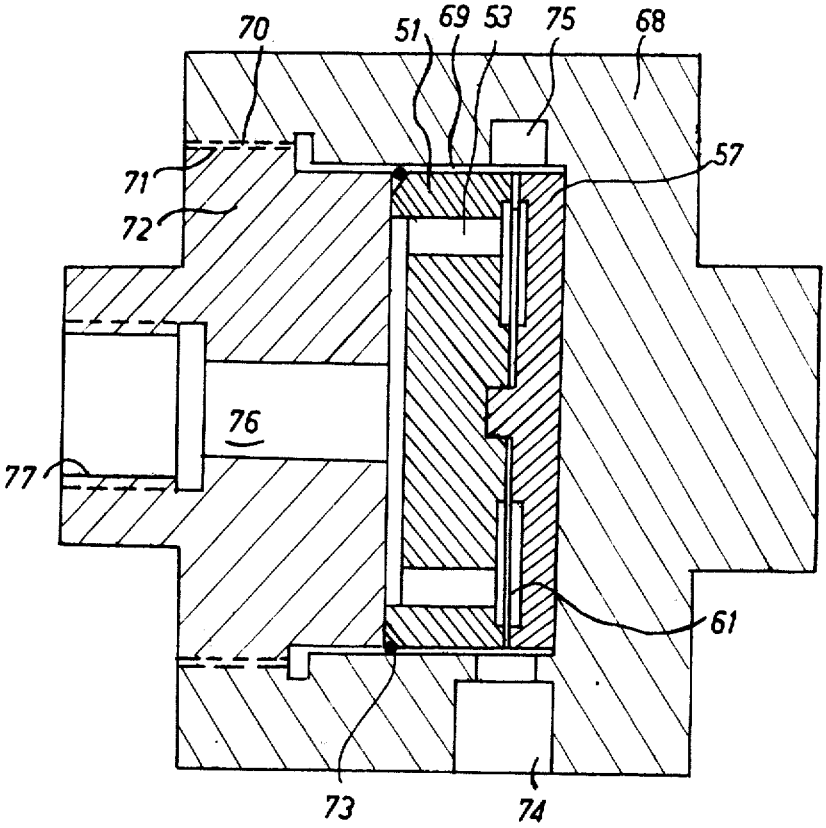
Figure 12:
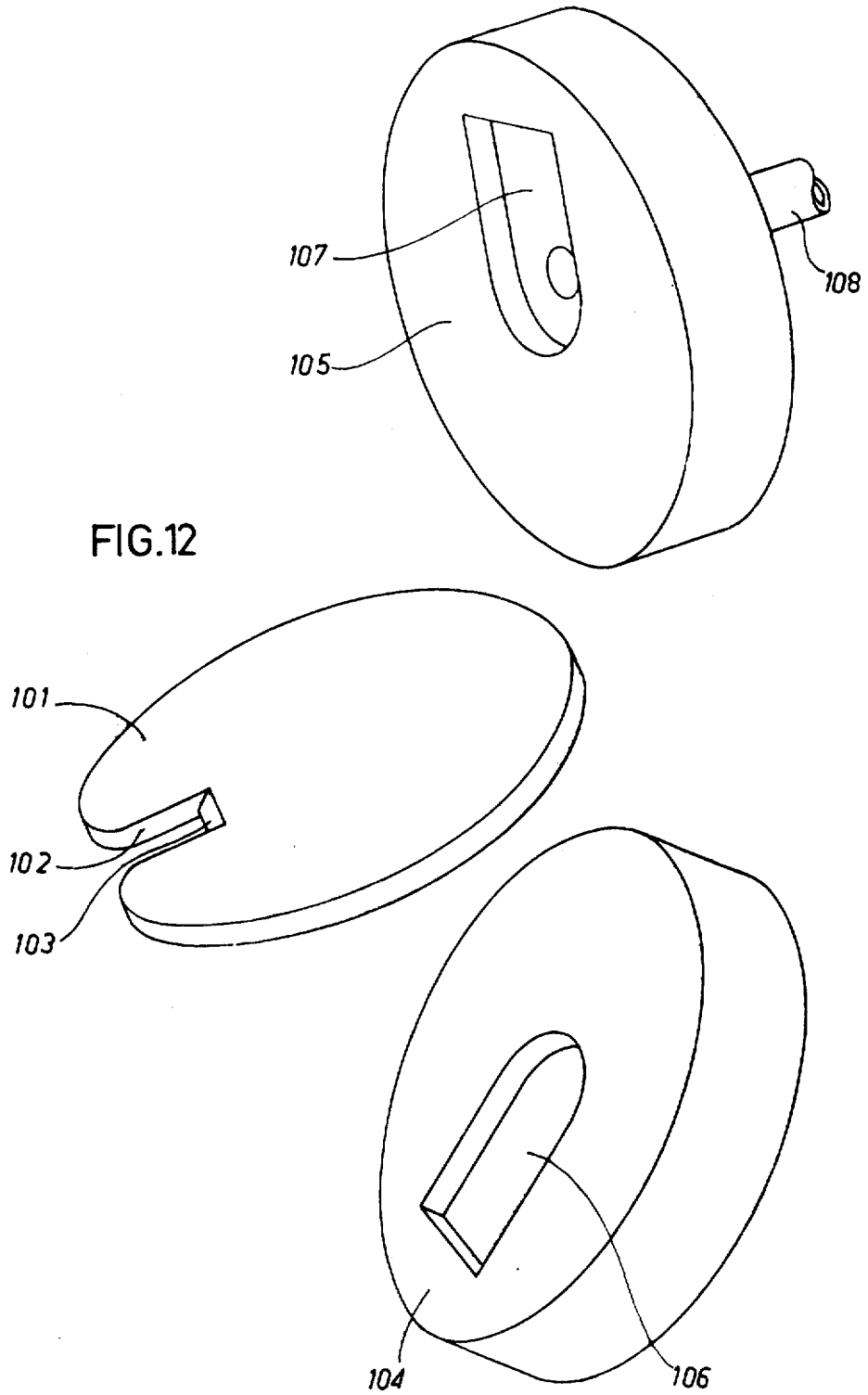
Figure 13:
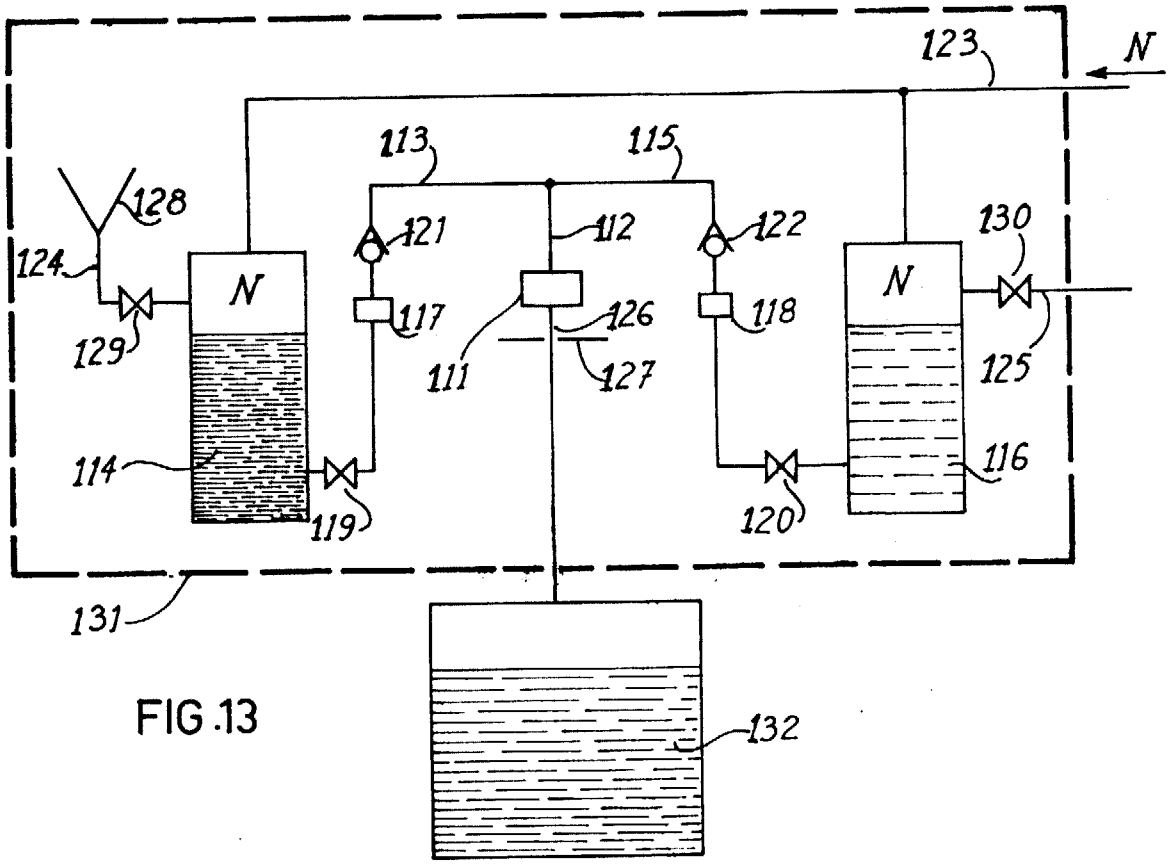

FIGS. 8, 9, 10 and 11 concern a device in accordance with the invention applied to the obtaining of emulsions of water in fuel oil;

FIG. 8 shows in plan view the face of a first side plate having eight recesses;

FIG. 9 shows in plan view the face of a second side plate also having eight recesses;

FIG. 10 shows in plan view a membrane provided with two notches;

FIG. 11 shows in section a device in accordance with the invention;

FIGS. 12 and 13 concern a device in accordance with the invention applied to the obtaining of emulsions of paraffin or microcrystalline wax in water;

FIG. 12 is an exploded view in perspective of an emulsifier, the two side plates and the membrane being shown fanned apart for greater clarity in the drawing;

FIG. 13 is a diagram of the arrangement of the emulsifier and of its feed members in a particular mounting.

Referring to FIGS. 1, 2 and 3, a circular thin membrane of stainless steel 1 comprises a discontinuity 2 in the form of a groove shown in the upper part of FIG. 1, having a radius of the membrane as its axis of symmetry. The discontinuity 2 is continued by a discontinuity 3. The discontinuities 2 and 3 form a groove. It is advantageous to provide the bottom of the groove with a bevel 4 on one face or both faces of the membrane.

The membrane 1 is placed between two side plates 5 and 6, respectively provided with a cavity 7 and a cavity 8. The free space between the two side plates, determined by the discontinuity 2, constitutes a passage whose rectangular cross-section decreases towards the center of the membrane. The fluid penetrates into the device via this passage. The discontinuity 3 constitutes a passage for the fluid from one cavity into the other.

The fluid is evacuated through a conduit 9, the axis of which need not be parallel to the axis of flow of the fluid in the discontinuity 2. For example, as shown in the drawing, the axis of the conduit 9 can be perpendicular to the membrane 1. The means used to maintain the two side plates pressed against each other have not been shown in the figures for purposes of simplicity. Any known means can be employed. Thus the device may comprise, for instance, clamping bolts which pass through the solid parts of the side plates 5 and 6 and of the membrane 1. It is also possible to screw one side plate onto the other.

The cavities 7 and 8 advantageously have their large axis parallel to the axis of flow of the fluid in the discontinuity 2. They may be of equal volume and of parallelepiped shape.

The fluid is introduced into the device by the discontinuity 2. It escapes therefrom via the conduit 9.

The applicant believes that the generation of the [ ultrasonics ] *sonic and/or ultrasonic waves* can be explained as follows:

The device operates as a fluid reciprocator (i.e., "seesaw" balance) due to the existence of two cavities 7 and 8 fed by a single fluid inlet. The difference in pressure present between the cavities 7 and 8 causes the membrane to vibrate. The optimum operating conditions are those for which the frequency of the swinging movement of the fluid from one cavity into the other is equal to the inherent frequency of the membrane 1. The dimensions of the cavities must be such that the phenomenon of resonance is obtained.

With reference to FIGS. 4 and 5, a circular thin membrane of stainless steel 10 has in its upper portion a discontinuity 12 shaped as a groove, having a radius of the membrane as its axis of symmetry. The discontinuity 12 is continued by a discontinuity 13 which has two branches. The latter define a blade 14 which may advantageously terminate in a bevel 14a on one or both of its faces.

The membrane 10 is clamped between two side plates 15 and 16. The side plates are provided with cavities 17 and 18, one of which has a discharge conduit 19.

Referring to FIGS. 6 and 7, a circular thin membrane of stainless steel 20 has at its center a first discontinuity 21 which is followed by two second discontinuities 22 and 23. The latter each have two branches, each of which defines a blade, 24 and 25 respectively.

The fluid is introduced through a conduit 26. The side plates 27 and 28 have two pairs of recesses 29 and 30 on the one hand and 31, 32 on the other hand. Each pair has a fluid evacuation conduit, 33 and 34 respectively.

One application of the devices in accordance with the invention resides in their use for the production of emulsions and more particularly emulsions of water in fuel oil. It is known that these emulsions can be burned instead of pure fuel oil. Their use decreases the proportion of unburned hydrocarbons and carbon monoxide in the smoke.

A mixture of water and fuel oil in suitable proportions is introduced into the internal recesses in the side plates via the discontinuity 2 (or 12 or 21). The water and the fuel oil are mixed before introduction in a simple mixing chamber. It is also possible to have the water and the fuel oil arrive through two arms of a T or to have a water inlet debouch into a pipe through which the fuel oil flows. It is advisable in this case to provide a nonreturn device in order to avoid the entrance of the fuel oil into the water conduit when the water pressure accidentally drops. The groove 2, or 12, advantageously is provided upstream with a readily accessible filtering device. This device, which may be reduced to a simple disk of fritted material, avoids the rapid clogging of the internal recesses of the emulsifier due to dust and the impurities present in the fuel oil and in the water.

The discontinuity 3 (or 13, or the discontinuities 22 and 23) provides communication between the recesses of a pair with each other.

The emulsion is extracted via the conduits 9 (or 19, or 33 and 34). The rate of flow of emulsion depends on the thickness of the blade and the width of the discontinuity 2 (or 12 or 21).

The frequency of the vibrations depends on the geometry of the inside of the device. This frequency may *be in the sonic or ultrasonic range (as illustrated by the following examples). It preferably may be below 40,000 cps. As demonstrated below, it may be as low as 1,250 cps. A somewhat narrower range may* vary between 8,000 and 40,000 cycles per second.

The first type of device is suitable for the feeding of small burners (20 to 40 therms/hour) as well as larger burners (up to 750 therms/hour). The second type of device is suitable in particular for the feeding of large burners (350 to 900 therms/hour).

EXAMPLE I

This example relates to a device in accordance with FIGS. 1, 2, and 3.

The characteristics of the membrane are as follows:

Diameter: 18 mm
Thickness: 0.12 mm
Nature: 18/8 steel
Length of the discontinuities (2 + 3) : 3.6mm
Width of the discontinuity 2 at the periphery of the membrane: 3.4mm
Width of the discontinuity 3 measured on the bevel: 0.7 mm.

The membrane is clamped between two side plates of brass screwed to each other at their periphery. The characteristics of the cavities are as follows:

Depth: 1 mm
Cross-sectional area: 11 mm × 5 mm

The feeding of such a device by 5.7 liters/hour of a mixture of domestic fuel oil and water (containing 20% by volume water) produces an emulsion which can feed a burner of 30 therms/hour. The frequency of the vibrations is 15,000 cycles per second.

EXAMPLE II

This example relates to a device in accordance with FIGS. 4 and 5.

The characteristics of the membrane are as follows:

Diameter: 20 mm
Thickness: 0.25 mm
Nature: steel Z 30 C 13
Length of the discontinuity (12): 4 mm
Height of the blade (14): 16 mm
Area of the blade (14): 3 mm × 6 mm
Area of the discontinuity (13): 1 mm × 6 mm The membrane is clamped between two side plates. The characteristic of the recesses in the side plates are as follows:

Depth: 1 mm
Cross-sectional area: 1 mm × 6 mm

The feeding of such a device with 57 liters/hour of a mixture of domestic fuel oil and water (20 percent water by volume) produces an emulsion which can feed a burner of 300 therms/hour; the frequency of the vibrations is 1,250 cycles per second.

EXAMPLE III

This example relates to a device in accordance with FIGS. 6 and 7.

The characteristics of the membrane are as follows:

Diameter: 40 mm

Thickness: 0.20 mm

Nature: steel 18/8

Area of the discontinuity (21): 10 mm × 3 mm

Area of the blades (24) and (25): 3 mm × 6 mm

The membrane is clamped between two side plates the recesses of which have the following characteristics:

Depth: 1 mm

Cross-sectional area: 11 mm × 6 mm

The feeding of such a device with 86 liters/hour of a mixture of light fuel oil and water (20 percent water by volume) produces an emulsion which can feed the burner of a boiler of 500 therms/hour. The frequency of the vibrations is 3,600 cycles per second.

With reference to FIGS. 8 to 11, a still further embodiment of the invention for obtaining emulsions of water in fuel oil is described.

Referring to FIG. 8:

The side plate 51 has eight recesses 52. Each recess is provided with a cylindrical conduit 53 which places the two faces of the side plate in communication. Two blind holes 54 and 55 respectively are drilled in the side plate 51. The periphery of the concealed face of the side plate is beveled (dashed line 56) on the face opposite the face shown in FIG. 8.

Referring to FIG. 9:

The side plate 57 also has eight recesses 58 placed in the same position as the recesses 52 of the side plate 51. Two protruding centering pins 59 and 60 are machined to be able to penetrate into the blind holes 54 and 55 respectively.

The side plates 51 and 57 constitute a pair of side plates which can be used over a wide range of fluid flow rates. The membrane which is placed between the pair of side plates determines the exact application of the device within said range, which is related on the one hand to the thickness of the membrane and on the other hand to the width and number of notches which the latter has. This number may in the present case be between one and eight.

Referring to FIG. 10:

The membrane 61, whose diameter is equal to the diameter of the side plates 51 and 57, has two notches 62 and 63. These notches are composed of a first discontinuity 64 of the membrane formed at the periphery of the membrane and a second discontinuity 65 which is the extension of the first discontinuity. The edges of the second discontinuity are parallel to each other. The first and second discontinuities form a groove or a single passage. The bottom of the groove which is perpendicular to the edges of the second discontinuity can be provided with a bevel. The bevel has not been shown in FIG. 10. The notches 62 and 63 have the same axes of symmetry as the recesses of the side plates 51 and 57. It is not necessary for the two notches to be located alongside of each other.

The membrane 61 has two holes 66 and 67 of the same size, located in the same positions as the holes 54 and 55 respectively.

Referring to FIG. 11:

The part 68 has a bore hole 69 in which the side plates 51 and 57 are placed. The membrane 61 is placed between the side plates. The bore hole 69 is continued by an internally threaded part 70 in which there is screwed the threaded portion 71 of a part 72. By tightening the parts 68 and 72 together, they press the side plates 51 and 57 very hard against each other. The reference number 73 designates a ring. The fluid or mixture of fluids is introduced through the orifice 74 which debouches into the bore hole 69 of the part 68 at the level of the volume 75 which acts as distribution conduit. The fluid or the emulsion is extracted from the pairs of recesses by the conduits 53 and then from the device by the conduit 76 which terminates in a threaded portion 77.

The loss of head can be maintained substantially constant whatever the rate of flow by varying the characteristics of the membranes (thickness, number and width of the discontinuities).

Thus in the case of the feeding of a boiler, the drop in pressure in the fluids taking place between the inlet and outlet of the device is substantially constant and independent of the power of the boiler. This drop in pressure may, for instance, be between 2 and 4 bars.

The frequency of vibration may be between 10,000 and 25,000 cycles per second.

The use of a filtering device is necessary if it is desired that the emulsifying device retain its entire effectiveness for a long period of time.

Example IV below, which is given by way of further illustration, relates to a device in accordance with FIGS. 8, 9, 10 and 11.

EXAMPLE IV

The characteristics of the side plates are as follows:

Diameter: 40.0 mm

Width of the recesses: 5.0 mm

Total length of the recesses: 10.5 mm

Distance from the bottom of a recess to the center of the side plate: 7.0 mm

Distance from the center of the conduits 53 to the center of the side plate: 15 mm Diameter of the conduits 53: 3 mm Diameter of the blind hole 54 and of the pin 59: 3 mm Diameter of the blind hole 55 and of the pin 60: 3 mm The characteristics of the membrane are as follows:

Diameter: 40.0 mm

Depth of the two notches 62 and 63: 3.5 mm comprising: for the first discontinuity 64: 2.5 mm for the second discontinuity 65: 1.0 mm Width of the notches at the periphery of the membrane: 3.4mm The feeding of a device in accordance with FIG. 11 with 80 liters/hour of a mixture of domestic fuel oil and water (20 percent water by volume) produces an emulsion which can feed a burner of 500 therms/hour. The frequency of the vibrations is 15,000 cycles per second.

Referring to FIGS. 12 and 13, there will now be described an application of the invention for obtaining emulsions of paraffin or microcrystalline wax in water:

Referring to FIG. 12, the membrane 101 having a discontinuity 102 and a bevel 103 is placed between two side plates 104 and 105 (when the apparatus is in operating position), each provided with a recess 106 and 107. The mixture of paraffin wax, water and emulsifying agent is introduced into the emulsifier through the discontinuity 102. The jet of emulsion is recoverd via the conduit 108 which communicates with the inside of the device. The recesses 106 and 107 communicate with each other via the portion of the discontinuity 102 close to the bevel 103.

It is advantageous to premix the components of the emulsion, that is to say the paraffin wax, the water and the emulsifying agent, before introducing them into the emulsifying device. This can be done in simple fashion by having the paraffin wax, water and emulsifying agent inlets converge into a single conduit before introduction into the emulsifier.

The components of the emulsion should be introduced under pressure into the emulsifying device. For this purpose one can employ either the pressure of an inert gas acting on the surface of each of the components placed in a feed tank, or a pump placed on the path of each of the components between the feed tank and the place of convergence of the different components.

The pressure of the jet of emulsion at the outlet of the device can be regulated by the use of an outlet nozzle. In the absence of a nozzle, the outlet pressure is equal to atmospheric pressure.

The applicants have noted that the difference which exists between the values of the pressure at the inlet and at the outlet of the device should be equal to at least two bars. If the difference in pressure is less than two bars, the emulsion is very thick and it is not stable, as shown by the tests reported below.

The components of the emulsion must be introduced into the emulsifying device at a temperature generally between 80° and 99° C. The exact value depends on the paraffin wax used. For a given paraffin wax, it is not greater than the temperature to be employed in the conventional emulsion manufacturing method.

A simplified flow sheet of the emulsifier and the feed members is given in FIG. 13.

The emulsifier 111 is fed via the line 112 with a mixture of paraffin wax, emulsifying agent and water. The paraffin wax and the emulsifying agent are conducted towards the emulsifying device 111 by the line 113 under the effect of the pressure exerted by nitrogen located above the free surface of the liquid in the tank 114. The water is conducted by the line 115, under the effect of the nitrogen pressure in the tank 116, towards the emulsifying device 111. The reference numbers 117 and 118 designate filters. The lines 113 and 115 are each provided with a gate valve (119 and 120 respectively) and with a check valve (121 and 122 respectively). The nitrogen is brought by the line 123 into the tanks 114 and 116. The nitrogen pressure is fixed at the desired value. The tanks 114 and 116 are fed by the lines 124 and 125 respectively. The emulsion is extracted from the emulsifying device 111 by the line 126 which may possibly have a nozzle 127.

The charging of the tanks 114 and 116 can be effected intermittently or continuously via the lines 124 and 125. The reference number 128 designates a mechanism for the charging of the paraffin wax, the references 129 and 130 designating gate valves.

The collection of parts described above are located within an enclosure 131 whose temperature is maintained at about 95° C. Outside of the enclosure is the emulsion receiving tank 132.

In the diagram described above, the emulsifying agent is added to the paraffin wax before the production of the emulsion. The latter can be effected, for instance, with nonionic emuslifying agents of the type of alkyl phenol or fatty alcohol condensate and ethylene or propylene oxide, or esters of fatty acids and polyalcohols, or else amides derived from animated fatty acid and alkylol. The emulsifying agents of the same type may be added to the water prior to the preparation of the emulsion rather than to the paraffin wax.

When the emulsifying agents are synthesized in situ, which is, for instance true of the anionic emulsifiers of the amine soap type, the components of the emulsifying agent may be added either together with the water or the paraffin wax, or with the water in the case of one of them and the paraffin wax in the case of the other.

The invention is further illustrated by Example V below.

EXAMPLE V

By means of an emulsifying device identical to that shown in FIG. 12, the characteristics of which are:

| | |
|---|---|
| diameter of the membrane | 18 mm |
| thickness of the membrane | 11/100 mm |
| width of the discontinuity | 70/100 mm |
| depth of the discontinuity | 3.5 mm |

connected in accordance with FIG. 13, the following tests were carried out, varying on the one hand the composition of the emulsion and on the other hand the ΔP. The temperatures of the water and of the paraffin wax were equal to 95° C.

The results are set forth on the following table:

| Test number | 1 | 2 | 3 | 4 | T(6) |
|---|---|---|---|---|---|
| Composition of the emulsion (by wt.): | | | | | |
| Emulsifying agent (1) | 6.0 | 6.0 | 6.0 | 6.0 | 6.0 |
| Paraffin wax (2) | 60.0 | 59.0 | 59.0 | 59.0 | 59.0 |
| Water | 34.0 | 35.0 | 35.0 | 35.0 | 35.0 |
| ΔP (in bars) | 0(3) | 2 | 6 | 9 | — |
| Properties of the emulsion: | | | | | |
| Viscosity at 20° C. (in ° Engler) | Thick | 20 | 6.9 | 12 | 21 |
| Conduct upon shaking (4) | | Stable | Stable | Stable | Stable |
| Centrifuging (5) | | 0 | 0 | 0 | <1 |
| Diameter of the particles (in μ) | | *2–5 | 1–2 | 1–3 | 1–2 |

*Irregular.

ΔP: difference between the pressures prevailing at the inlet and outlet of the emulsifying device.

1. Composition of the emulsifying agent: mixture of sorbitan monostearate and stearic ether of polyethylene oxide.

2. Physical characteristics of the paraffin wax:
   melting point: 52° C
   viscosity at 100° C: 3.2 cst
   oil content: 2 percent by weight
3. Test No. 1 was carried out in the absence of vibrating membrane.
4. Measured with 130 ± 10 blows/minute, amplitude equal to 8 ± 1 cm for 60 minutes. "Stable" means that no rupture or thickening occurs.
5. Measured in percent (by volume) of water separating out under an acceleration 240 times the acceleration of gravity maintained for 30 minutes.
6. The emulsion "T" was prepared by the conventional method, that is to say by agitation of a mixture of paraffin wax, water and emulsifying agent by means of an agitator rotating at a speed of 200 rpm.

The tests reported in the preceding table show that emulsions of good quality are obtained when the difference in pressure is equal to or greater than two bars. They are less viscous than the emulsion "T" prepared by conventional means.

We claim:

1. Device for generating [ ultrasonics ] *waves* in a fluid *in the sonic to ultrasonic range*, comprising a membrane, two side plates located on each side of the membrane and each having at least one recess, said recesses forming adjacent opposing pairs, said membrane having at least a first discontinuity which forms a passage through which the fluid penetrates into the device and at least a second discontinuity extending the first discontinuity and forming a communication between each pair of said recesses located on each side of the membrane, each such second discontinuity leaving a substantial portion of said membrane extending between each respective pair of recesses sufficient to effectively vibrate, and a conduit from one recess of each pair via which the fluid is evacuated from the device.

2. Device according to claim 1, each side plate having a single recess.

3. Device according to claim 1, said first discontinuity being located on the periphery of the said membrane, said second discontinuity being an extension of the said first discontinuity, and the first and second discontinuities consisting of a single groove.

4. Device according to claim 3, wherein said membrane has at least one axis of symmetry, said recesses form pairs which have equal volumes and are symmetrical with respect to a plane perpendicular to said membrane at its axis of symmetry.

5. Device according to claim 1, said first discontinuity being located at the periphery of the said membrane and said second discontinuity having two branches defining a blade in the membrane.

6. Device according to claim 5, wherein said membrane has at least one axis of symmetry, said recesses form pairs which have equal volumes and are symmetrical with respect to a plane perpendicular to said membrane at its axis of symmetry.

7. Device according to claim 1, each side plate having at least two recesses.

8. Device according to claim 7, further comprising a plurality of second discontinuities, said first discontinuity being located substantially at the center of said membrane and said second discontinuities constituting grooves.

9. Device according to claim 8, wherein said membrane has at least one axis of symmetry, said recesses form pairs which have equal volumes and are symmetrical with respect to a plane perpendicular to said membrane at its axis of symmetry.

10. Device according to claim 7, the number of first discontinuities of the membrane being between one and the number of recesses of each side plate.

11. Device according to claim 10, said first discontinuity or discontinuities being located on the periphery of the said membrane, and the said second discontinuity or discontinuities being in the extension of the first, each pair of first and second discontinuities constituting a single groove.

12. Device according to claim 11, further comprising a distributing conduit which receives said fluid and distributes it to the periphery of said membrane in flow communication with said first discontinuity.

13. Device according to claim 12, comprising means for preventing the rotation of the said membrane between said side plates.

14. Device according to claim 10, comprising means for preventing the rotation of the said membrane between said side plates.

15. Device according to claim 14, said means being formed of locking pins rigidly connected with one of the side plates which pass through holes provided in the membrane and engage in blind holes provided in the other side plate.

16. Device according to claim 10, comprising means which press the side plates strongly against each other.

17. Device according to claim 7, said first discontinuity being located substantially at the center of the said membrane and further comprising a plurality of second discontinuities, each having several branches defining blades in the membrane.

18. Device according to claim 17, wherein said membrane has at least one axis of symmetry, said recesses form pairs which have equal volumes and are symmetrical with respect to a plane perpendicular to said membrane at its axis of symmetry.

19. Device according to claim 1, wherein said membrane has at least one axis of symmetry, said recesses form pairs which have equal volumes and are symmetrical with respect to a plane perpendicular to said membrane at its axis of symmetry.

20. Device according to claim 1 for the obtaining of emulsions of water in fuel oil, comprising filtering means for cleaning said fuel oil and said water, means for mixing the water, fuel oil, and any other ingredients in desired proportions, and means for feeding said ingredients into the passage formed by the said first discontinuity and for maintaining a pressure drop of at least 2 bars.

21. Device according to claim 1 for the obtaining of emulsions of paraffin or microcrystalline wax in water further comprising means for supplying a mixture of water, paraffin or microcrystalline wax, and an emulsifying agent together under a pressure at least more than 2 bars greater than the pressure in the said evacuation conduit.

22. Device according to claim 21, further comprising means for having the temperature of said mixture at the inlet being between 80° and 99° C.

23. Device according to claim 21, said evacuation conduit comprising a nozzle.

24. Device according to claim 21, further comprising means for maintaining the absolute pressure of said mixture at the inlet at more than 3 bars.

*25. A device according to claim 1, wherein said device is constructed to generate waves below 40,000 cps.*

*26. A device according to claim 25, wherein said*

*device is constructed to generate waves from about 1,250 cps to about 40,000 cps.*

*27. A device according to claim 20, wherein said device is constructed to generate waves below 40,000 cps.*

*28. A device according to claim 27, wherein said device is constructed to generate waves from about 1,250 cps to about 40,000 cps.*

* * * * *

UNITED STATES PATENT AND TRADEMARK OFFICE

CERTIFICATE OF CORRECTION

PATENT NO. : RE 29161
DATED : March 29, 1977
INVENTOR(S) : Duthion et al.

It is certified that error appears in the above-identified patent and that said Letters Patent are hereby corrected as shown below:

Change the title to read:

DEVICE FOR WAVE GENERATION IN FLUIDS AND THEIR APPLICATION TO THE PREPARATION OF EMULSIONS

Signed and Sealed this

Fourteenth Day of June 1977

[SEAL]

*Attest:*

RUTH C. MASON
*Attesting Officer*

C. MARSHALL DANN
*Commissioner of Patents and Trademarks*